US006935993B2

(12) United States Patent
Grabscheid et al.

(10) Patent No.: US 6,935,993 B2
(45) Date of Patent: Aug. 30, 2005

(54) ROLL

(75) Inventors: Joachim Grabscheid, Gerstetten (DE); Klaus Wulz, St. Poelten (AU)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 10/094,318

(22) Filed: Mar. 8, 2002

(65) Prior Publication Data

US 2002/0183180 A1 Dec. 5, 2002

(30) Foreign Application Priority Data

Mar. 9, 2001 (DE) ........................................ 101 12 202

(51) Int. Cl.[7] ............................ D21F 1/60; F16C 13/00

(52) U.S. Cl. .............................. 492/20; 492/47; 492/7; 492/16; 162/289

(58) Field of Search ......................... 162/289; 384/419; 492/59, 45, 47, 6, 7, 50, 16, 20, 48; 100/162 B; 29/895.2, 895.21, 895.22

(56) References Cited

U.S. PATENT DOCUMENTS 1,853,879 A * 4/1932 Paxton et al. ................. 492/47
1,868,860 A * 7/1932 Reis .............................. 492/7
3,629,950 A * 12/1971 Tall ............................ 34/421
3,678,846 A * 7/1972 Bjokegren .............. 100/155 R
3,941,435 A * 3/1976 Tuomaala ...................... 492/6
4,158,128 A * 6/1979 Evdokimov et al. ........ 219/469
4,305,191 A * 12/1981 Enomoto ....................... 492/7
4,449,278 A 5/1984 Geyken et al. ............... 29/132
4,612,692 A * 9/1986 Molinatto ...................... 492/7
4,856,158 A 8/1989 Lindroos et al. ........... 29/116.1
5,052,090 A * 10/1991 Kitaura et al. ................ 492/18
5,170,547 A * 12/1992 Nikulainen et al. ........... 492/53
5,469,619 A * 11/1995 Renck ......................... 492/47
6,068,582 A 5/2000 Grabscheid .................. 492/16
6,311,615 B1 * 11/2001 Hilliard ...................... 101/212
6,468,193 B1 * 10/2002 Shimoda ...................... 492/45
2001/0008863 A1 * 7/2001 Vuorimies et al. ............ 492/20

FOREIGN PATENT DOCUMENTS

DE 2734268 2/1979
DE 29613795 1/1997
DE 198 22 145 A1 12/1999 .......... F16C/13/02

* cited by examiner

*Primary Examiner*—Marc Jimenez
(74) *Attorney, Agent, or Firm*—Taylor & Aust, P.C.

(57) ABSTRACT

The invention relates to a roll, including a roll tube that is supported exclusively, at least in radial direction, in an axially central area on a continuous roll support, whereby outside of the central area the roll tube is positioned at a distance A from the roll support, thereby permitting a deflection of the roll tube relative to the roll support.

The invention is further characterized in that the roll tube is equipped with increased weights on both ends in order to create a deflection component in the respective ends due to the respective effective additional weight.

20 Claims, 3 Drawing Sheets

ROLL

BACKGROUND OF THE INVENTION

1. Field of the Invention.

The present invention relates to a roll, and, more particularly, to a roll tube that is supported exclusively, at least in a radial direction, in an axially central area on a continuous roll support.

2. Description of the Related Art.

Center supported rolls (CSR) are utilized as guide rolls for wires, fabrics, fiber webs, foils or in similar applications.

One center supported roll located in a former of a machine for the production of a fiber web, specifically a paper or cardboard web, serves to improve wire travel through the former. Due to the deflection characteristics, which are diametrically opposed to those occurring with conventional arrangements where the roll tubes are supported by side journals, the negative influences of other rolls upon the wire travel can be compensated, at least partially, by a center-supported roll. This permits, for example, partial compensation for length differentials of a wire loop at the edges rather than at the center.

The dead weight component of a roll tube, as in conventional side supported rolls, causes a positive or a negative spreading effect, depending on the direction of wrap. The difference is that a center supported roll provides a positive spreading effect, whereas a conventional roll causes a negative spreading effect. Preferred installation positions for a center-supported roll are therefore at locations where a large wrap and/or a conventional roll cause a great negative spreading effect.

A disadvantage of such a center supported roll is that it provides only a negligible deflection based on dead weight, particularly if fiber reinforced synthetic material is used for the roll tube. In other words, this arrangement causes only a negligible spreading effect.

SUMMARY OF THE INVENTION

The present invention provides a roll having a positive spreading effect due to greater deflection, thereby compensating, as much as possible, for the negative spreading effect caused by the rolls, such as suction rolls, located in the wire loop.

The roll tube is equipped with increased weights on both ends in order to create a definite deflection component, in each respective end, due to the additional weight. The resulting deflections in the two ends, from the two deflection components, create the desired increased positive spreading effect of the roll.

In a first embodiment of the invention the increased weight includes at least one single-piece additional weight. The concept of the add-on weight provides the possibility of weight adjustment, relative to various operational conditions, by simply exchanging the add-on weights.

The add-on weight is in the embodiment of a cylindrical ring, having an essentially constant outside diameter and mounted, at least partially, inside the end of the roll tube. Alternatively, the add-on weight may be in the embodiment of a cylindrical ring, having at least two outside diameters and mounted inside, as well as outside the end of the roll tube. The largest outside diameter of the add-on weight is no larger than the outside diameter of the roll tube.

In another embodiment, the add-on weight, in the form of a cylindrical ring, has at least two grooves located symmetrically about the axis of the ring. These grooves serve to optimize the add-on weights, with regard to dynamic aspects of the roll, as well as reduce the operating weight of the add-on weight. In order to achieve and guarantee optimum operation of the roll the location of the add-on weight is adjustable, preferably by way of a clamping device.

In yet another embodiment, according to the invention, the increased weight is provided by at least one material build-up as exemplified by an increased wall thickness of the roll tube. In a preferred method, the material build-up is accomplished during the manufacturing process of the roll.

In still yet another embodiment, according to the invention, the increased weight is achieved by utilization at least one material having a density greater than the density of the roll tube. This provides the desired increased weight without substantial volume increase for a given contour. It is advantageous if the material, having the greater density, is surrounded, preferably completely, by the material of the roll tube.

In order to maintain the desired spreading effect of the roll, the additional weight is in a range of 0.5 to 1.5 times the weight of the roll tube, preferably from 0.8 to 1.2 times the weight of the roll tube.

In accordance with a preferred design of the invention, the roll tube is manufactured from a material having a substantially lower flexural strength than the material utilized for the roll support. This soft deflecting construction of the roll tube and the comparatively deflection resistant construction of the roll support provides for relative movement between the two ends of the roll and the roll support allowing large deformations of the roll tube to be achieved.

A preferred material for the roll tube includes a fiber reinforced synthetic material, such as a glass fiber reinforced plastic material or a carbon fiber reinforced synthetic material. It is especially desirable to wind this material type onto the roll tube during the manufacturing process.

In respect to a first roll design, the roll tube is rigidly linked mechanically, in the axial central area, with a roll support, and the roll support is rotatably mounted in a roll frame. The mountings of the roll support, in the roll frame, include at least one CARB bearing (Continuous Alignment Roller Bearing). Such CARB type bearings are manufactured by AB SKF of The SKF Group.

With respect to a second roll design, the roll tube is mounted in the axial central area, rotating on the roll support, whereby the center mount includes at least one spherical roller bearing.

It is understood that the aforementioned characteristics of the invention, which will be explained in further detail below, may be utilized not only in the cited combination, but also in other combinations or on their own, without abandoning the scope of the invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Additional characteristic and advantages of the invention result from the sub-claims and the following description of preferred design examples, with reference to the drawing.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
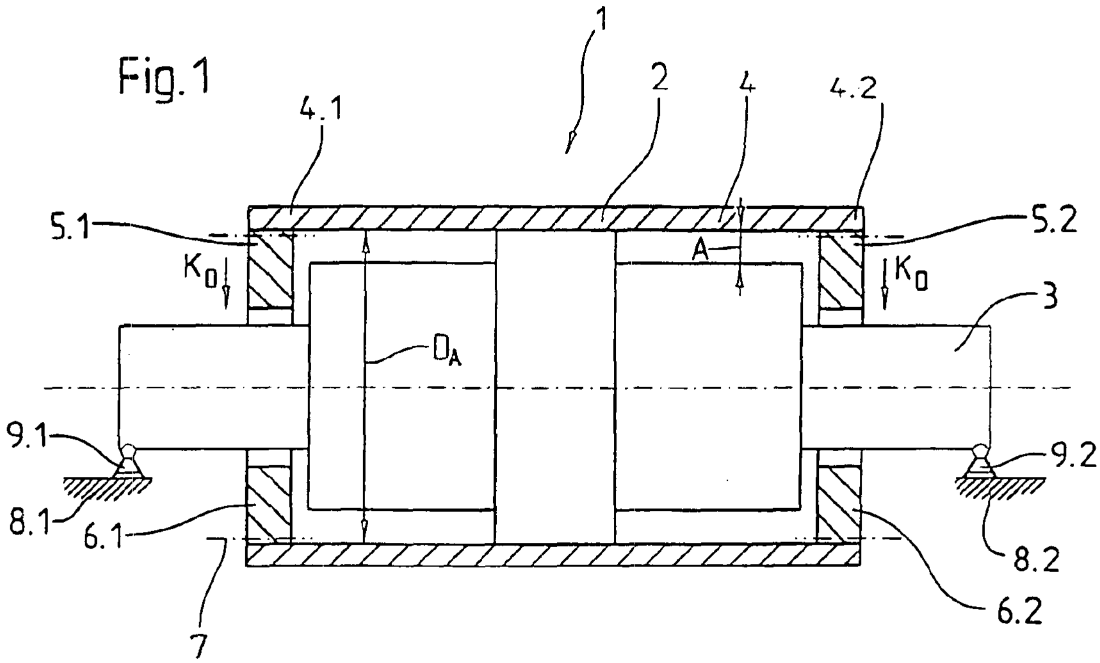
FIG. 1 is a schematic cross-sectional view of an embodiment of a roll of the present invention.
Figure 2:
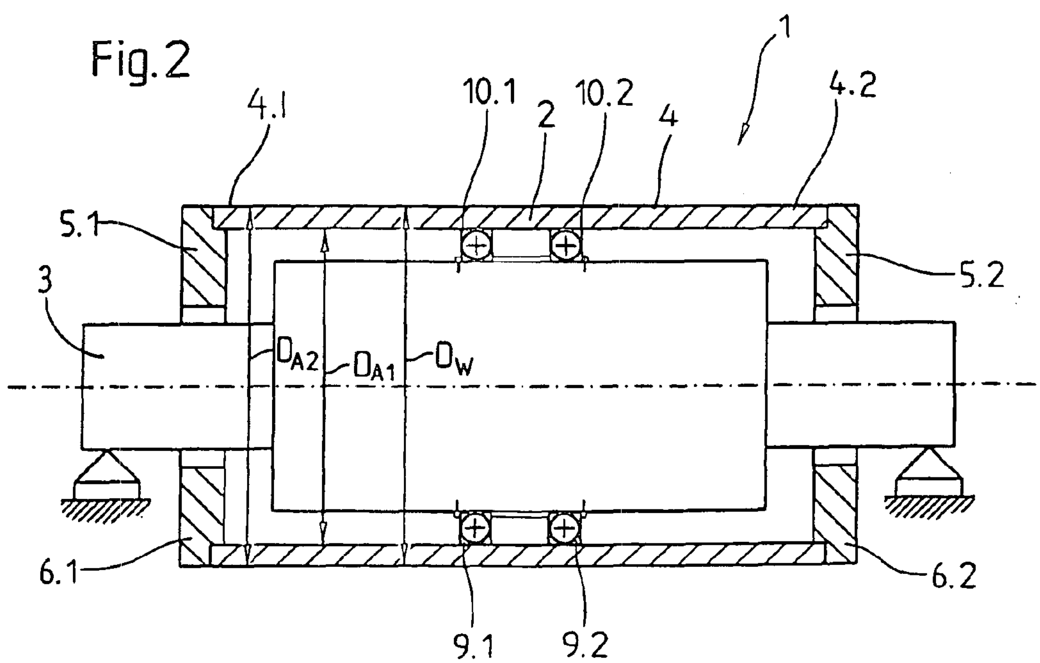
FIG. 2 is a schematic cross-sectional view of another embodiment of a roll of the present invention.

Referring now to the drawings, and more particularly to FIG. 1, there is shown a schematic longitudinal section, not to scale, of a first roll 1 according to the present invention, including a roll tube 4 that is supported exclusively, at least in a radial direction, in an axially central area 2 on a continuous roll support 3. Outside of central area 2 roll tube 4 is positioned a distance A from roll support 3, thereby permitting a deflection of roll tube 4 relative to roll support 3. As can be seen in FIGS. 1 and 2. central area 2 extends less than ½ of the length of roll tube 4. Preferably, central area 2 extends less than ⅓ of the length of roll tube 4.

Roll tube 4 is equipped on both ends 4.1 and 4.2, respectively, with increased weights, in the form of single-part add-on weights 5.1 and 5.2. The action of add-on weights 5.1 and 5.2 is to create a defined deflection component $K_D$ (arrow) due to dead weight applied to ends 4.1 and 4.2. Add-on weights 5.1 and 5.2 may include several components, specifically various weights of various dimensions. Add-on weights 5.1 and 5.2 are in a range of 0.5 to 1.5 times the weight of roll tube 4, preferably from 0.8 to 1.2 times the weight of roll tube 4. Add-on weights 5.1 and 5.2 are in the form of cylindrical rings 6.1 and 6.2 having an essentially constant outside diameter $D_A$ and mounted at least partially inside ends 4.1 and 4.2, respectively, of roll tube 4. The location of add-on weights 5.1 and 5.2 is adjustable, by way of clamping device 7, in accordance with the state of the art, which may be a clamping ring or similar device. Clamping device 7 is indicated by a dot-dash line.

Roll tube 4 is produced from a material having a lower, specifically a substantially lower, flexural strength than the material utilized for roll support 3. Roll tube 4 may, for example, consist of a fiber reinforced synthetic material, whereby roll tube 4 favors a material build-up.

Roll tube 4 is firmly linked mechanically, in axially central area 2, with roll support 3, and roll support 3 is rotatably mounted in roll frame 8.1 and 8.2. Mountings 9.1 and 9.2 of roll support 3 in roll frame 8.1 and 8.2 include at least one CARB bearing. Now, additionally referring to FIG. 2, there is shown a schematic longitudinal section, not to scale, of a second embodiment of roll 1 in accordance with the present invention. Whereas, the basic design of roll 1 is similar in principle to roll 1 in FIG. 1, only addition features will be discussed.

Add-on weights 5.1 and 5.2 are in the form of cylindrical rings 6.1 and 6.2, which have at least two outside diameters $D_{A1}$ and $D_{A2}$. Cylindrical rings 6.1 and 6.2 are mounted inside, as well as outside; of ends 4.1 and 4.2 of roll tube 4. Large outside diameter $D_{A2}$ of add-on weights 5.1 and 5.2 is not larger than outside diameter $D_W$ of roll tube 4. The outside contour of rings 6.1 and 6.2 are not limited to a circular contour with at least one diameter; rather the contour may be conical (wedge-shaped), parabolic, polygonal, etc.

Roll tube 4 is mounted in axial central area 2, rotating on roll support 3, whereby center mounting 9.1 and 9.2 includes at least one spherical roller bearing 10.1, 10.2, schematically illustrated in FIG. 2.

Figure 3:
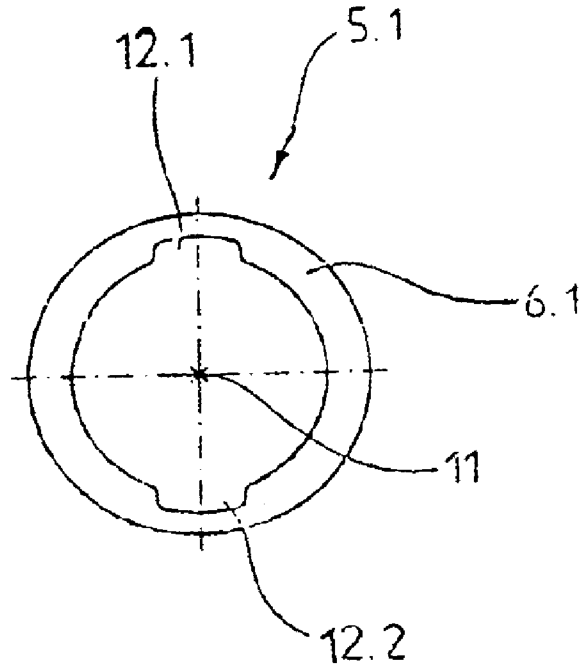
FIG. 3 is an end view of an add-on weight used in conjunction with the rolls shown in FIGS. 1 and 2.

Now, additionally referring to FIG. 3, there is shown a front view of add-on weight 5.1 in accordance with the present invention. Add-on weight 5.1, in the form of cylindrical ring 6.1, has at least two grooves 12.1 and 12.2 located symmetrically to ring axis 11. The basic form of grooves 12.1 and 12.2 are not limited to the form of grooves 12.1 and 12.2 illustrated in FIG. 3; they may adopt any manufactured and/or dynamically optimum form like rounds, cracks, steps, curves etc.

Figure 4:
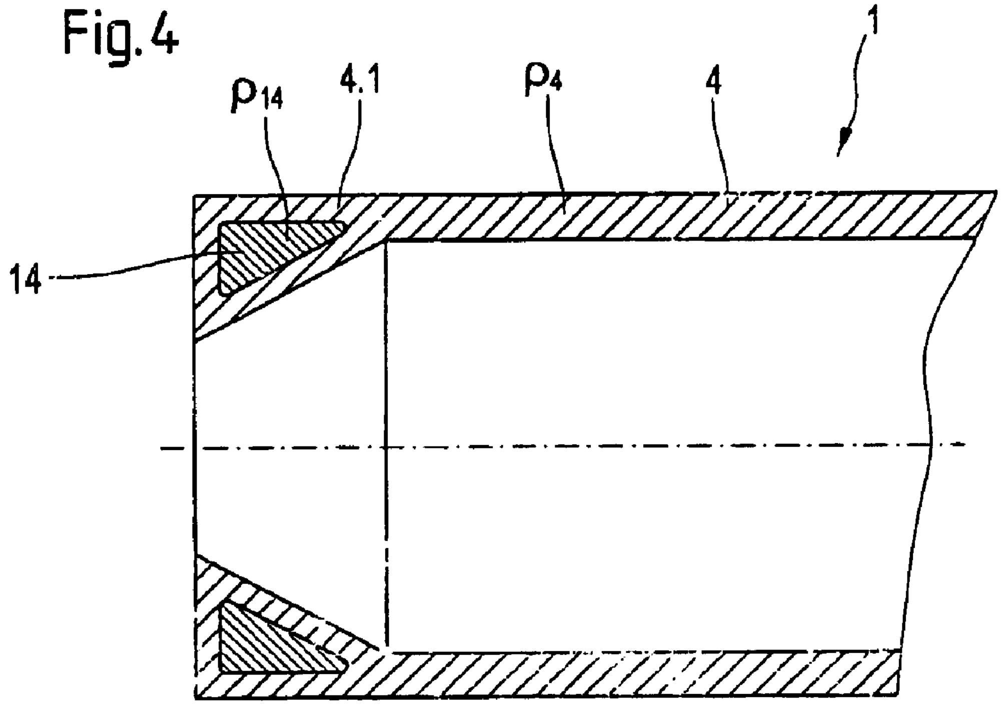
FIG. 4 is a cross-sectional view of an embodiment of an end of the rolls shown in FIGS. 1 and 2.
Figure 5:
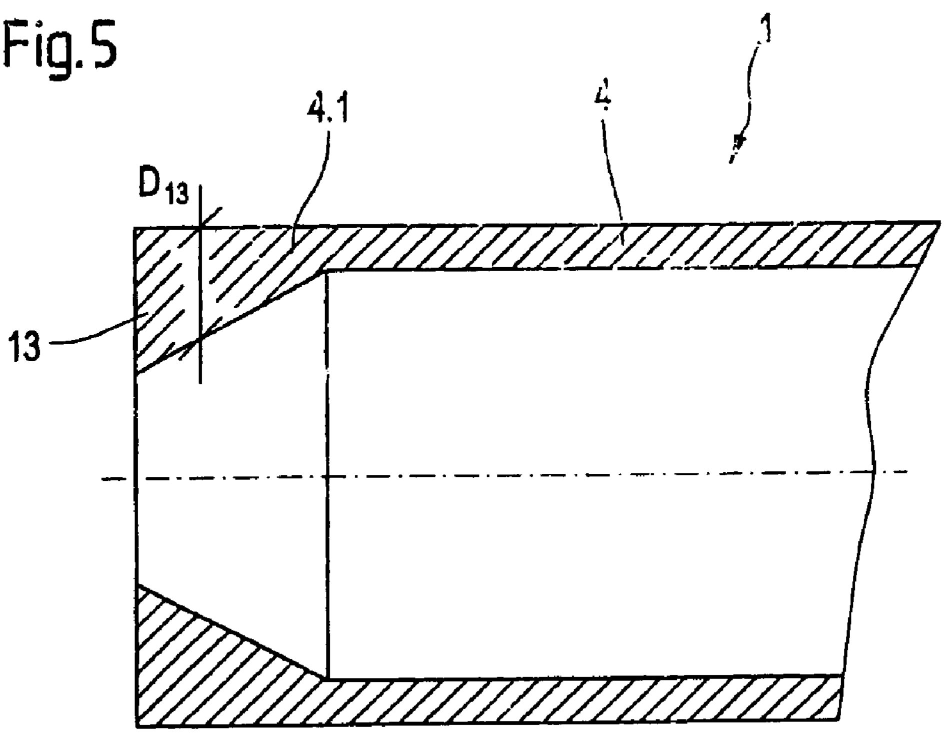
FIG. 5 is a cross-sectional view of another embodiment of an end of the rolls shown in FIGS. 1 and 2.

Now, additionally referring to FIGS. 4 and 5, there is shown an additional schematic, not true to scale, of a longitudinal section of end 4.1 of roll 1 according to the present invention, however not illustrating roll support 3. Since the basic design of roll 1 is similar in principle to the embodiment illustrated in FIG. 1, we additionally refer to that illustration.

Roll tube 4 is equipped at ends 4.1 and 4.2 with an increased weight, utilizing at least one material 14 having density $\rho_{14}$ that is greater than the density $\rho_4$ of roll tube 4. Material 14 having greater density $\rho_{14}$, which may adopt any desired dynamically balanced form, may be surrounded completely by the material of roll tube 4. Moreover, FIG. 5 provides that roll tube 4 is equipped at ends 4.1 and 4.2 with increased weight, by way of material build-up 13, as exemplified by an increased wall thickness $D_{13}$ of roll tube 4. Material build-up 13 may adopt any desired dynamically balanced form, which may result from the manufacturing process. Alternatively, material 14, having greater density $\rho_{14}$ and/or material build-up 13, may be distributed in circumferential direction on roll tube 4. In other words, it can be mounted in sections. Only a dynamically balanced arrangement is important, such that out-of balance conditions are avoided.

In conclusion, the invention creates a roll providing an increased positive spreading effect due to greater deflection, under its dead weight, thereby compensating for the negative spreading effect caused by other rolls, such as suction rolls, located in the wire loop.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

| Component Identification | |
|---|---|
| 1 | Roll |
| 2 | Axial center area |
| 3 | Roll support |
| 4 | Roll tube |

-continued

| Component Identification | |
|---|---|
| 4.1, 4.2 | End |
| 5.1, 5.2 | Add-on weight (increased weight) |
| 6.1, 6.2 | Cylindrical ring |
| 7 | Clamping device |
| 8.1, 8.2 | Roll frame |
| 9.1, 9.2 | Mounting |
| 10.1, 10.2 | Spherical roller bearing |
| 11 | Ring axis |
| 12.1, 12.2 | Groove |
| 13 | Material build-up (increased weight) |
| 14 | Material (increased weight) |
| A | Distance |
| $D_A$, $D_{A1}$, $D_{A2}$, $D_W$ | Outside diameter |
| $D_{13}$ | Wall thickness |
| $K_D$ | Deflection component (arrow) |
| $\rho_{14}$ | Density (material) |
| $\rho_4$ | Density (roll tube) |

What is claimed is:

1. In a paper machine, a roll, comprising:

a guide roll tube in a forming section of the paper machine, said guide roll tube having a first end, a second and a central area, said guide roll tube being a single tube having a substantially cylindrical exterior surface that is not in contact with any other part of the roll, said central area being less than ½ the length of said guide roll tube, said guide roll tube not being associated in defining a nip with any other guide roll tube;

a roll support radially supporting said guide roll tube only in said central area, such that said guide roll tube is spacedly positioned from said roll support outside of said central area, said guide roll tube being directly supported only by said roll support; and a plurality of additional weights, at least one of said plurality of additional weights connected to said first end and at least one of said plurality of additional weights connected to said second end, said plurality of additional weights creating a deflection component, each of said weights having a thickness substantially greater than a thickness of said guide roll tube.

2. The paper machine of claim 1 wherein said plurality of additional weights are each single-part add-on weights.

3. The paper machine of claim 2, wherein each said add-on weight is a substantially cylindrical ring having an outside diameter, one said cylindrical ring being disposed at least partially inside said first end and an other said cylindrical ring being disposed at least partially inside said second end.

4. The paper machine of claim 2, wherein each said add-on weight is a substantially cylindrical ring having at least two outside diameters, one said cylindrical ring disposed at least partially inside said first end and an other said cylindrical ring disposed at least partially inside said second end, each said cylindrical ring configured such that the largest of said at least two diameters is not larger than an outside diameter of said guide roll tube.

5. The paper machine of claim 2, wherein each said add-on weight is a substantially cylindrical ring, each said cylindrical ring having at least two grooves symmetrically disposed about an axis of said cylindrical ring.

6. The paper machine of claim 2, further comprising at least one clamping device associated with said add-on weights, said add-on weights adjustably disposed about one of said first end and said second end.

7. The paper machine of claim 1, wherein said guide roll tube includes an increased wall thickness.

8. The paper machine of claim 7, wherein said increased wall thickness is integral with said guide roll tube.

9. The paper machine of claim 1, wherein said roll tube is made of a first material having a first density, said plurality of additional weights being made of a second material with a second density, said second density being greater than said first density.

10. The paper machine of claim 9, wherein said second material is at least partially surrounded by said first material.

11. The paper machine of claim 1, wherein said plurality of additional weights together weigh approximately 0.5 times to approximately 1.5 times the weight of said guide roll tube.

12. The paper machine of claim 11, wherein said plurality of additional weights together weigh approximately 0.8 times to approximately 1.2 times the weight of said guide roll tube.

13. The paper machine of claim 1, wherein said guide roll tube is made of a material having a first flexure strength, said roll support being made of a material having a second flexure strength, said first flexure strength being less than said second flexure strength.

14. The paper machine of claim 13, wherein said first flexure strength is substantially less than said second flexure strength.

15. The paper machine of claim 1, further comprising a roll frame, said guide roll tube being linked mechanically in said central area to said roll support, said roll support rotatably mounted to said roll frame.

16. The paper machine of claim 15, further comprising at least one CARB bearing, said roll support rotatably mounted to said roll frame by said GARB bearing.

17. The paper machine of claim 1, wherein said guide roll tube is rotatably supported by said roll support.

18. In a paper machine, a roll, comprising:

a guide roll tube in a forming section of the paper machine, said guide roll tube having a first end, a second end and a central area, said guide roll tube being a single tube having a substantially cylindrical exterior surface that is not in contact with any other part of the roll, said central area being less than ½ the length of said guide roll tube, said guide roll tube not being associated in defining a nip, with any other roll tube, said guide roll tube is made of a reinforced synthetic material including a material build up;

a roll support radially supporting said guide roll tube only in said central area, such that said guide roll tube is spacedly positioned from said roll support outside of said central area, said guide roll tube being directly supported only by said roll support; and a plurality of additional weights, at least one of said plurality of additional weights connected to said first end and at least one of said plurality of additional weights connected to said second end, said plurality of additional weights creating a deflection component, each of said weights having a thickness substantially greater than a thickness of said guide roll tube.

19. The paper machine of claim 18, wherein said reinforced synthetic material is a glass fiber reinforced plastic material.

20. In a paper machine, a roll comprising:

a guide roll tube in a forming section of the paper machine, said guide roll tube having a first end, a second end and a central area, said guide roll tube being a single tube having a substantially cylindrical exterior surface, said central area being less than ½ the length of said guide roll tube, said guide roll tube not being associated in defining a nip with any other roll tube;

at least one spherical roller bearing, said guide roll tube being rotatably directly supported only by said at least one spherical roller bearing in said central area;

a roll support radially supporting said at least one spherical roller bearing; and a plurality of additional weights, at least one of said plurality of additional weights connected to said first end and at least one of said plurality of additional weights connected to said second end, said plurality of additional weights creating a deflection component, each of said weights having a thickness substantially greater than a thickness of said guide roll tube.

* * * * *

UNITED STATES PATENT AND TRADEMARK OFFICE

CERTIFICATE OF CORRECTION

PATENT NO. : 6,935,993 B2
DATED : August 30, 2005
INVENTOR(S) : Grabscheid et al.

It is certified that error appears in the above-identified patent and that said Letters Patent is hereby corrected as shown below:

Column 3,
Line 27, after "FIGS. 1 and", delete "2." and substitute -- 2, --.

Column 5,
Line 25, between "second" and "and" insert -- end --; and
Line 44, after "claim 1", insert -- , --.

Column 6,
Line 34, delete "GARB" and substitute -- CARB --; and
Line 63, between "roll" and "comprising", insert -- , --.

Signed and Sealed this

Sixth Day of June, 2006

JON W. DUDAS
*Director of the United States Patent and Trademark Office*